(12) United States Patent
Wendt

(10) Patent No.: US 9,990,019 B2
(45) Date of Patent: Jun. 5, 2018

(54) APPARATUS FOR POWERING AN ELECTRICAL CONSUMER VIA A DATA CONNECTION

(75) Inventor: Matthias Wendt, Würselen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 1039 days.

(21) Appl. No.: 13/819,884

(22) PCT Filed: Aug. 5, 2011

(86) PCT No.: PCT/IB2011/053499
§ 371 (c)(1),
(2), (4) Date: Feb. 28, 2013

(87) PCT Pub. No.: WO2012/028979
PCT Pub. Date: Mar. 8, 2012

(65) Prior Publication Data
US 2013/0159754 A1    Jun. 20, 2013

(30) Foreign Application Priority Data
Sep. 2, 2010   (EP) ..................................... 10175078

(51) Int. Cl.
*G06F 1/26* (2006.01)
*H04L 12/10* (2006.01)
(Continued)

(52) U.S. Cl.
CPC ............... *G06F 1/266* (2013.01); *H04L 12/10* (2013.01); *H04L 12/12* (2013.01);
(Continued)

(58) Field of Classification Search
CPC . G06F 1/26; G06F 1/266; G06F 1/324; H04L 12/10; H04L 12/12;
(Continued)

(56) References Cited

U.S. PATENT DOCUMENTS

| 6,548,799 B1 | 4/2003 | Matsumoto |
| 7,548,799 B2 | 6/2009 | Landry et al. |

(Continued)

FOREIGN PATENT DOCUMENTS

| CN | 101380519 A | 3/2009 |
| EP | 1675313 A2 | 6/2006 |

(Continued)

OTHER PUBLICATIONS

IEEE STD 802.3 AF, 2003; Part 3: Carrier Sense Multiple Access With Collision Detection (CSMA/CD) Access Method and Physical Layer Specifications, Amendment: Data Terminal Equipment (DTE) Power Via Media Dependent Interface (MDI), IEEE Computer Society, Institute of Electrical and Electronics Engineers, Inc., Jun. 18, 2003.

*Primary Examiner* — Terrell S Johnson
(74) *Attorney, Agent, or Firm* — Meenakshy Chakravorty

(57) ABSTRACT

The invention relates to an apparatus (1) for powering an electrical consumer (3, 4, 5) via a data connection (6, 7, 8). The apparatus comprises a power supply (2) for supplying power to the electrical consumer via the data connection, a data receiving unit (9) for receiving data to be sent to the electrical consumer, and a controller (10) for activating the supply of power to the electrical consumer via the data connection, if data to be sent to the electrical consumer have been received and the supply of power to the electrical consumer is deactivated. The electrical consumer itself does therefore not need to receive power from the apparatus, in order to stay alert to be able to react on data connection activity, thereby reducing the power consumption.

13 Claims, 3 Drawing Sheets

(51) Int. Cl.
    *H04L 12/40*     (2006.01)
    *H04L 12/12*     (2006.01)
    *H04L 12/24*     (2006.01)

(52) U.S. Cl.
    CPC .... *H04L 12/40045* (2013.01); *H04L 41/0833* (2013.01); *Y02B 60/34* (2013.01)

(58) Field of Classification Search
    CPC .......... H04L 12/40045; H04L 41/0833; H04L 12/24; H04L 41/00; Y02B 60/34; H04W 4/021
    USPC ....................................................... 713/330
    See application file for complete search history.

(56) References Cited

U.S. PATENT DOCUMENTS

| | | | |
|---|---|---|---|
| 8,224,401 B1 * | 7/2012 | Schlichter | H04W 4/021 455/127.1 |
| 2006/0164062 A1 | 7/2006 | Stineman, Jr. et al. | |
| 2006/0271678 A1 * | 11/2006 | Jessup | G06F 1/3203 709/224 |
| 2007/0053360 A1 * | 3/2007 | Hino et al. | 370/392 |
| 2007/0223520 A1 * | 9/2007 | Diab | H04L 12/10 370/463 |
| 2007/0288784 A1 * | 12/2007 | Koper et al. | 713/324 |
| 2009/0062004 A1 | 3/2009 | Vedurmudi | |
| 2009/0070615 A1 * | 3/2009 | Maggiolino et al. | 713/340 |
| 2009/0112373 A1 * | 4/2009 | Feldman et al. | 700/286 |
| 2010/0031070 A1 | 2/2010 | Tomomitsu | |
| 2010/0145543 A1 * | 6/2010 | Middlemiss | 700/295 |
| 2011/0320833 A1 * | 12/2011 | R | H04L 12/12 713/310 |
| 2012/0228936 A1 * | 9/2012 | Kabbara et al. | 307/29 |

FOREIGN PATENT DOCUMENTS

| | | |
|---|---|---|
| EP | 2222018 A1 | 8/2010 |
| JP | 2007148781 A | 6/2007 |
| JP | 2007281628 A | 10/2007 |
| JP | 2008529352 A | 7/2008 |
| JP | 2009061277 A | 3/2009 |
| JP | 2009081723 A | 4/2009 |
| JP | 2009088833 A | 4/2009 |
| JP | 2009284116 A | 12/2009 |
| WO | 2006081044 A2 | 8/2006 |
| WO | 2006081046 A2 | 8/2006 |

* cited by examiner

APPARATUS FOR POWERING AN ELECTRICAL CONSUMER VIA A DATA CONNECTION

FIELD OF THE INVENTION

The invention relates to an apparatus for powering an electrical consumer via a data connection and a system comprising the apparatus, the electrical consumer and the data connection. The invention relates further to a corresponding method and a corresponding computer program for powering an electrical consumer via a data connection.

BACKGROUND OF THE INVENTION

Power-over-Ethernet (PoE) is an active standard (IEEE 802.3.af) which allows a PoE supply to provide electrical energy to detached networked electrical consumers like routers, switches, printer spoolers, et cetera over their standard Ethernet cable connection. However, if the detached networked electrical consumers are in their standby state they still take some power from the PoE power supply to keep internal processing alert to be able to react on any Ethernet activity. Thus, even in the standby state of the detached networked electrical consumers the power consumption is quite high.

SUMMARY OF THE INVENTION

It is an object of the present invention to provide an apparatus for powering an electrical consumer via a data connection and a system comprising the apparatus, the electrical consumer and the data connection, wherein the power consumption can be reduced. It is a further object of the present invention to provide a corresponding method and a corresponding computer program for powering an electrical consumer via a data connection.

In a first aspect of the present invention an apparatus for powering an electrical consumer via a data connection is presented, wherein the apparatus comprises:
 a power supply for supplying power to the electrical consumer via the data connection,
 a data receiving unit for receiving data to be sent to the electrical consumer,
 a controller for activating the supply of power to the electrical consumer via the data connection, if data to be sent to the electrical consumer have been received and the supply of power to the electrical consumer is deactivated.

Since the controller activates the supply of power to the electrical consumer, if data to be sent to the electrical consumer have been received and the supply of power to the electrical consumer is deactivated, the electrical consumer itself does not need to be supplied by power of the apparatus, in order to stay alert to be able to react on data connection activity. In particular, if the electrical consumer is deactivated and does not receive power from the apparatus, and if data should be sent to the deactivated electrical consumer, the controller activates the supply of power to the electrical consumer, thereby allowing the electrical consumer to activate itself and to receive the data. Thus, since the electrical consumer does not need to stay alert to be able to react on data connection activity, the power consumption can be reduced.

The apparatus is preferentially adapted to power the electrical consumer via an Ethernet connection.

If the supply of the power to the electrical consumer is deactivated, i.e. if a port of the apparatus to which the electrical consumer is connected is deactivated, the data connection is preferentially in a state in which data cannot be sent to or received from the electrical consumer, i.e. the respective port is preferentially completely switched off. If the port to the electrical consumer is activated, it gets powered-up and enters a state, in which the electrical consumer can receive data via the data connection.

The electrical consumer is, for example, a light source, a sensor, a switch, et cetera.

The received data are, for example, a switch-off command or a dim-to-zero command coming from a networked light controller and transported in a TCP/IP packet over the Ethernet to the apparatus. The received data comprise preferentially an indication to the electrical consumer to which the received data have to be sent. In particular, the received data comprise the IP address of the electrical consumer to which the received data have to be sent.

The apparatus is preferentially adapted to selectively power several electrical consumers, which are connected to the apparatus via several data connections.

It is also preferred that the apparatus comprises a data storage unit for storing the received data, wherein the controller is adapted to send the stored received data to the electrical consumer via the data connection, after the supply of power to the electrical consumer has been activated. In particular, the controller is adapted to send the stored received data to the electrical consumer via the data connection, after a predetermined time after the controller has started to activate the supply of power to the electrical consumer. This gives the electrical consumer some time for, for example, booting up, wherein the time is preferentially predetermined such that the controller sends the stored received data to the electrical device via the data connection, after the electrical consumer is ready for receiving the stored received data, for example, after the electrical consumer has been booted up.

The controller can be adapted to repeatedly send the stored received data to the electrical consumer. In an embodiment, the controller is adapted to repeatedly send the stored received data to the electrical consumer, until an acknowledge signal is received from the electrical consumer. The controller can also be adapted to send the stored received data only a limited number of times to the electrical consumer or only for a limited time interval, after the controller has started to activate the supply of power to the electrical consumer, i.e. to activate the respective port to which the electrical consumer is connected. Since the stored received data can be repeatedly send to the electrical consumer, the electrical consumer can receive the data, even if in the beginning, i.e. immediately after the controller has started to activate the supply of power to the electrical consumer, the electrical consumer is not ready for receiving data. In this case, the electrical consumer will receive the repeatedly send data later, after the electrical consumer is ready for receiving the data.

The apparatus can comprise a state storage unit for storing whether the supply of power to the electrical consumer is activated or deactivated, wherein the controller is adapted to activate the supply of power to the electrical consumer via the data connection, if data to be sent to the electrical consumer have been received and it is stored in the state storage unit that the supply of power to the electrical consumer is deactivated. This allows determining whether the supply of power to the electrical consumer is activated or deactivated very fast by just looking into the state storage unit.

It is preferred that the controller is adapted to determine whether the received data comprise a deactivate command indicating that the electrical consumer is to be deactivated. It is preferred that the controller is adapted to deactivate the supply of power to the electrical consumer if the controller has determined that the received data comprise a deactivate command. Preferentially, the controller is adapted to a) send the deactivate command to the electrical consumer, b) wait a predefined time or determine whether the electrical consumer has already been deactivated, and c) deactivate the supply of power to the electrical consumer. The predefined time is preferentially defined such that the electrical consumer has sufficient time for the deactivation process, which may include cooling down the electrical consumer by a cooling device, storing of information, et cetera. The controller can determine whether the electrical consumer is deactivated by, for example, monitoring the power consumption of the electrical consumer or by sending ping commands to the electrical consumer. This allows to deactivate the electrical consumer via the controller, i.e. it is not necessary to deactivate the electrical consumer at a switch or the like of the electrical consumer.

It is further preferred that the apparatus comprises a state storage unit for storing whether the supply of the power to electrical consumer is activated or deactivated, wherein the state storage unit is adapted to store that the supply of power to the electrical consumer is deactivated if the controller has determined that the received data comprise a deactivate command. This allows updating the state storage unit such that the controller can always retrieve the actual state of the supply of the power to the electrical consumer from the state storage unit, without requiring to determine the state.

The controller can be adapted to determine whether the electrical consumer is activated or deactivated. In particular, the controller can be adapted to send the stored received data to the electrical consumer via the data connection, after the controller has been determined that the electrical consumer is activated.

It is further preferred that the controller is adapted to determine the power consumption of the electrical consumer and to determine whether the electrical consumer is activated or deactivated depending on the determined power consumption. This allows determining whether electrical consumer is activated or deactivated by just monitoring the power consumption of the electrical consumer.

It is preferred that the controller is adapted to receive from the electrical consumer a deactivate request indicating that the electrical consumer should be deactivated, wherein the controller is adapted to control the power unit such that the supply of power to the electrical consumer is deactivated, if the deactivate request has been received. In particular, the power unit is adapted to reduce the power for the electrical consumer to zero, if the deactivate request has been received. It is further preferred that the controller is adapted to monitor the power consumption of the electrical consumer and to control the power unit such that the power to the electrical consumer is deactivated, if the power consumption is below a threshold being indicative of an inactive state of the electrical consumer. For example, the threshold can be predefined such that a power consumption below the threshold is indicative of a standby state of the electrical consumer. Thus, by monitoring the power consumption of the electrical consumer it can be detected whether the electrical consumer is in a standby state or not. If the electrical consumer is in a standby state, the controller can control the power unit such that the power to the electrical consumer is switched off, thereby reducing the power consumption of the electrical consumer, if the electrical consumer has been switched to a standby state. Moreover, by controlling the power for the port to the electrical consumer based on a deactivate request from the electrical consumer or based on the monitored power consumption of the electrical consumer, the power supply to the electrical consumer can be controlled from the electrical consumer itself.

In an embodiment, the controller is adapted to receive from the electrical consumer an activate request indicating that the supply of power to the electrical consumer should be activated, wherein the controller is adapted to control the power unit such that the supply of power to the electrical consumer is activated, in particular, switched on, if the activate request has been received. In this embodiment, the data connection is in a state, in which data can be received from the electrical consumer, although the supply of power to the electrical consumer is deactivated, and the electrical consumer comprises an own power source for providing enough power for allowing to send the activate request to the apparatus. Also this allows controlling the power supply to the electrical consumer from the electrical consumer itself.

In a further aspect of the present invention a system is presented, wherein the system comprises:
    at least one electrical consumer,
    the apparatus for powering an electrical consumer via a data connection as defined in claim 1, and
    at least one data connection for transmitting data between the apparatus and the at least one electrical consumer and for powering the at least one electrical consumer via the at least one data connection by the apparatus. The system is, for example, a lighting system having several light sources being the electrical consumers, wherein the several light sources are powered by the apparatus via data connections.

In another aspect of the present invention a method for powering an electrical consumer via a data connection is presented, wherein the method comprises:
    receiving data to be sent to the electrical consumer by a data receiving unit,
    activating a supply of power to the electrical consumer via the data connection by a controller, if data to be sent to the electrical consumer have been received and the supply of power to the electrical consumer is deactivated, wherein power is supplied to the electrical consumer via the data connection by a power supply.

In a further aspect of the present invention a computer program for powering an electrical consumer via a data connection is presented, wherein the computer program comprises program code means for causing an apparatus as defined in claim 1 to carry out various method steps described herein, when the computer program is run on a computer controlling the apparatus.

It shall be understood that the apparatus of claim 1 and the system of claim 13 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
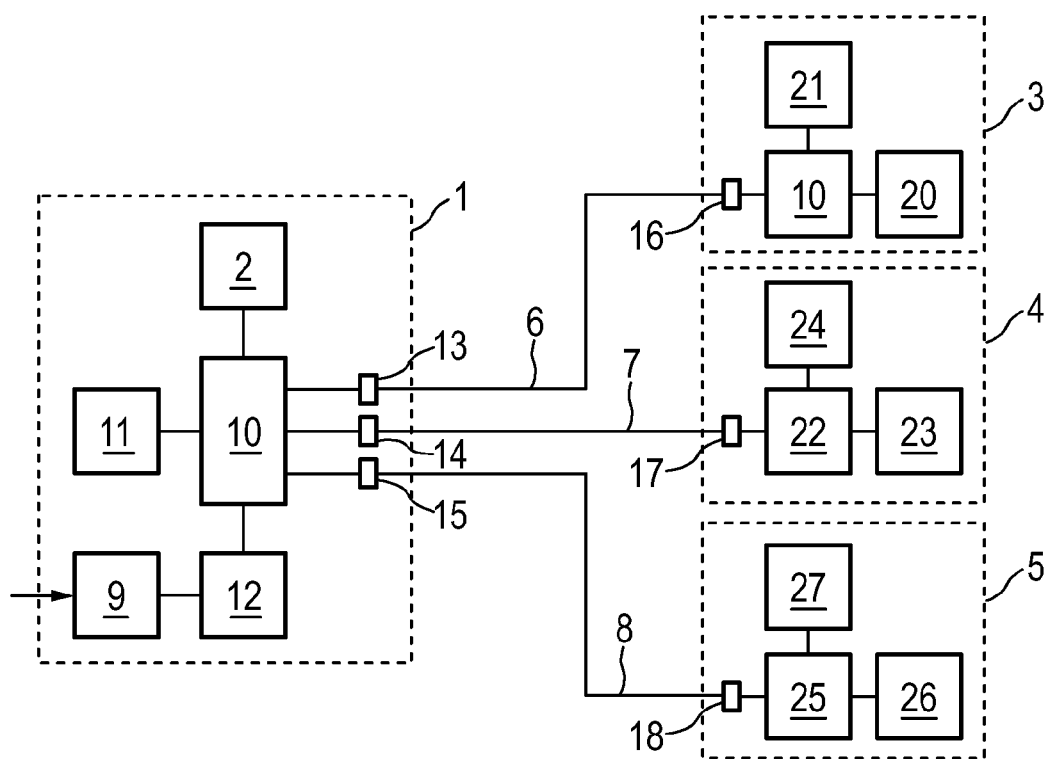
FIG. 1 shows schematically and exemplarily an embodiment of an apparatus for powering an electrical consumer via a data connection.

FIG. 1 show schematically and exemplarily an apparatus 1 for powering several electrical consumers 3, 4, 5 via several data connections 6, 7, 8. The data connections 6, 7, 8 are preferentially Ethernet cables. The apparatus 1 comprises several ports 13, 14, 15 for connecting the data connections 6, 7, 8 to the apparatus 1. Each of the electrical consumers 3, 4, 5 also comprises a port 16, 17, 18 for connecting the respective electrical consumer 3, 4, 5 to the apparatus 1 via the data connections 6, 7, 8. The apparatus 1 comprises a power supply 2 for supplying power to the electrical consumers 3, 4, 5 via the data connections 6, 7, 8 and a data receiving unit 9 for receiving data, which have been received, from, for example, an external controller, to be sent to one or several of the electrical consumers 3, 4, 5. However, the data receiving unit 9 can also be adapted to receive data from the electrical devices 3, 4, 5 through the respective ports 13, 14, 15. For example, the data receiving unit 9 can be adapted to receive data, which should be sent to one or several of the electrical consumers 3, 4, 5, from another of the electrical consumers 3, 4, 5, i.e. data can be exchanged between the electrical consumers 3, 4, 5 via the apparatus 1.

The apparatus 1 further comprises a controller 10 for activating the supply of power to the one or several electrical consumers 3, 4, 5 via the respective data connections 6, 7, 8, if data to be sent to the one or several electrical consumers 3, 4, 5 have been received and the supply of power to the respective electrical consumer 3, 4, 5, i.e. the respective port 13, 14, 15, is deactivated. The respective electrical consumer 3, 4, 5 does therefore not need to stay alert to be able to react on data connection data activity, because, if data are to be sent to the respective electrical consumer 3, 4, 5 and if the respective electrical consumers 3, 4, 5 is deactivated and does not receive power from the apparatus 1, the controller 10 activates the respective port 13, 14, 15 to the electrical consumer 3, 4, 5, which should receive the data, thereby reducing the power consumption of the respective electrical consumer 3, 4, 5.

Since the data connections 6, 7, 8 are preferentially Ethernet cables, the apparatus 1 is preferentially adapted to power the electrical consumers 3, 4, 5 via Ethernet connections 6, 7, 8. The apparatus 1 is therefore preferentially a PoE apparatus.

If the supply of power to the electrical consumer 3, 4, 5 is deactivated, i.e. if a respective port 13, 14, 15 of the apparatus 1 to which the respective electrical consumer 3, 4, 5 is connected is deactivated, the respective data connection 6, 7, 8 is preferentially in a state in which data cannot be sent to or received from the electrical consumer, i.e. the respective port 13, 14, 15 is preferentially completely switched off. If the port to the respective electrical consumer 3, 4, 5 is activated, it gets powered-up and enters a state, in which the respective electrical consumer 4, 5, 6 can receive data via the data connection.

The controller 10 is preferentially adapted to follow the standard of PoE for activating the supply of power to the respective electrical consumer 3, 4, 5 via the respective data connection 6, 7, 8, which is disclosed in, for example, "Part 3: Carrier Sense Multiple Access with Collision Detection (CSMA/CD) Access Method and Physical Layer Specifications, Amendment: Data Terminal Equipment (DTE) Power via Media Dependent Interface (MDI)", IEEE Computer Society, published by the Institute of Electrical and Electronics Engineers, Inc, 18 Jun. 2003, which is herewith incorporated by reference. This standard requires from a PoE Power Sourcing Equipment (PSE) to ensure that it does not apply 48 V to a non PoE enabled device. In this embodiment, the PoE PSE can be regarded as being the apparatus 1. Following the standard, the controller 10 is preferentially adapted to initially apply a low voltage, for example, 2.7 V to 10.1 V to the respective electrical consumer 3, 4, 5 via the respective data connection 6, 7, 8 and look for a signature resistance of 25 k$\Omega$. The controller expects that the signature resistance is after some form of auto-polarity circuit and will compensate for the DC offset in the signature. The maximum input capacitance of the respective electrical consumer 3, 4, 5 must be smaller than 150 nF. If the controller 10 has identified the signature resistance, the controller concludes that the respective electrical consumer 3, 4, 5 is a PoE enabled device and supplies a power of about 48 V to the respective electrical consumer 3, 4, 5. If the controller concludes that the respective electrical consumer 3, 4, 5 is not a PoE enabled device, the power of about 48 V is not applied to the respective electrical consumer 3, 4, 5 and preferentially the controller 10 monitors the current at small voltages of, for example, 2.7 and 10 V.

The electrical consumers 3, 4, 5 are, for example, light sources, sensors, switches, et cetera. The data received by the data receiving unit 9 are preferentially commands coming from a networked further controller, which is not shown in FIG. 1, and are transported in a TCP/IP packet over the Ethernet to the data receiving unit 9. Thus, the data received by the data receiving unit 9 contain preferentially a command like a switch-off command or a dim-to-zero command, if the respective electrical consumer 3, 4, 5 is a light source, and the IP address of the respective electrical consumer 3, 4, 5. The respective electrical consumer 3, 4, 5 can therefore remain in its deactivated state, until the data receiving unit 9 receives data containing the IP address of the respective electrical consumer 3, 4, 5 and a command which should be sent to the respective electrical consumer 3, 4, 5.

The apparatus 1 further comprises a state storage unit 11 for storing, whether the supply of power to the respective electrical consumer 3, 4, 5 is activated or deactivated. Thus, for example, for each electrical consumer 3, 4, 5 a flag can be set, if the supply of power to the respective electrical consumer 3, 4, 5 is deactivated. The controller 10 is preferentially adapted to activate the supply of power to the respective electrical consumer 3, 4, 5 via the respective data connection 6, 7, 8, if data to be sent to the respective electrical consumer 3, 4, 5 have been received and if it is stored in the state storage unit 11 that the supply of power to the respective electrical consumer 3, 4, 5 is deactivated. For instance, if the data receiving unit 9 receives data comprising a command and an IP address of a certain electrical consumer, the controller looks in the state storage unit 11, whether for this certain electrical consumer the flag is set, and, if this is the case, the controller activates the supply of power to this certain electrical consumer via the respective data connection 6, 7, 8.

The apparatus 1 further comprises a data storage unit for storing the received data, wherein the controller 10 is adapted to send the stored received date to the respective electrical consumer 3, 4, 5 via the respective data connection 6, 7, 8, after the electrical consumer 3, 4, 5 has been activated. In particular, the controller 10 is adapted to determine, whether the respective electrical consumer 3, 4, 5 has already been activated, and to send the stored received data to the respective electrical consumer 3, 4, 5 via the respective data connection 3, 4, 5 only, after the controller has been determined that the respective electrical consumer 3, 4, 5 is really in an activated state in which the respective electrical consumer 3, 4, 5 can receive the data, in particular, the command contained in the data. The controller 10 can be adapted to determine the power consumption of the respective electrical consumer 3, 4, 5 and to determine, whether the electrical consumer 3, 4, 5 is activated or deactivated depending on the determined power consumption. For example, a threshold can be predefined such that, if the power consumption is below the threshold, the respective electrical consumer is deactivated, and, if the power consumption is above the threshold, the respective electrical consumer is activated. The controller 10 can also be adapted to issue ping commands to the respective electrical consumer 3, 4, 5 and to wait for the reaction, in order to determine, whether the respective electrical consumer is activated, in particular, ready for receiving Ethernet data packets, or deactivated. The determined state of the respective electrical consumer 3, 4, 5 can also be used for updating the state storage unit 11, in particular, for initializing the state storage unit 11. For instance, in an initializing procedure, the controller 10 can determine the state of each of the electrical consumers 3, 4, 5 and the respective state can be stored in the state storage unit 11.

The controller 10 can also be adapted to send the stored received data to the respective electrical device 3, 4, 5 via the respective data connection 6, 7, 8, after a predetermined time after the controller 10 has started to activate the respective electrical consumer 3, 4, 5. Or, the controller 10 can be adapted to repeatedly send the stored received data to the respective electrical consumer 3, 4, 5, until an acknowledge is received from the respective electrical consumer 3, 4, 5. This allows sending the data to the respective electrical consumer 3, 4, 5, without firstly determining whether the respective electrical consumer is activated or deactivated.

The controller 10 is further adapted to determine, whether the received data comprise a deactivate command indicating that the respective electrical consumer 3, 4, 5 is to be deactivated. Moreover, the controller 10 is preferentially adapted to deactivate the respective port 13, 14, 15 to the respective electrical consumer 3, 4, 5 if the controller 10 has determined that the received data comprise a deactivate command and the state storage unit 11 is preferentially adapted to store that the supply of power to the respective electrical consumer 3, 4, 5 is deactivated, if the controller 10 has determined that the received data comprise a deactivate command. In particular, the received data can comprise the deactivate command and an IP address indicating the electrical consumer 3, 4, 5 to which the deactivate command has to be sent. The controller 10 preferentially extracts the IP address and the deactivate command and sends the deactivate command to the electrical consumer indicated by the IP address. The controller 10 waits a predefined time or determines whether the respective electrical consumer 3, 4, 5 has already been deactivated, and then deactivates the respective port 13, 14, 15 to the respective electrical consumer 3, 4, 5. The predefined time is preferentially defined such that the respective electrical consumer 3, 4, 5 has sufficient time for the deactivation process, which may include cooling down the electrical consumer by a cooling device, storing of information, et cetera. The controller 10 can determine whether the electrical consumer is deactivated by, for example, monitoring the power consumption of the respective electrical consumer 3, 4, 5 or by sending ping commands to the respective electrical consumer 3, 4, 5, wherein the respective port 13, 14, 15 is switched off, after the controller 10 has determined that the respective electrical consumer has been deactivated.

The state storage unit 11 comprises preferentially a table, in which for each port or for each IP address connected to a port, which is indicative of a respective electrical consumer 3, 4, 5, it is stored whether the supply of power to the corresponding electrical consumer is activated or deactivated.

The controller 10 can further be adapted to receive from the electrical consumers 3, 4, 5 a deactivate request indicating that the respective electrical consumer 3, 4, 5 should be deactivated, wherein the controller 10 is adapted to control the power unit 2 such that the power for the respective electrical consumer 3, 4, 5 is deactivated, if the deactivate request has been received. In particular, the power unit 2 is adapted to reduce the power for the respective electrical consumer 3, 4, 5 to zero, if the deactivate request has been received from the respective electrical consumer 3, 4, 5.

The controller 10 can further be adapted to monitor the power consumption of the electrical consumers 3, 4, 5 and to control the power unit 2 such that the power to a respective electrical consumer 3, 4, 5 is deactivated, if the power consumption of the respective electrical consumer 3, 4, 5 is below a threshold being indicative of an inactive state of the respective electrical consumer 3, 4, 5. The threshold is preferentially predefined such that, if the power consumption of the respective electrical consumer 3, 4, 5 is below the threshold, the respective electrical consumer 3, 4, 5 is deactivated, and, if the power consumption of the respective electrical consumer 3, 4, 5 is below the threshold, the respective electrical consumer 3, 4, 5 is activated.

The controller 10 can further be adapted to receive from the electrical consumers 3, 4, 5 an activate request indicating that the respective electrical consumer 3, 4, 5 should be activated, wherein the controller 10 is adapted to control the power unit 2 such that the power for the respective electrical consumer 3, 4, 5, i.e. the respective port 13, 14, 15, is activated if the activate request has been received. In particular, if an activate request has been received, an activation protocol is performed, which follows the above mentioned standard of PoE.

In the embodiment described with reference to FIG. 1, the electrical consumers 3, 4, 5 comprise data processing units 20, 23, 26, power supplies 21, 24, 27 and controllers 19, 22, 25. The controllers 19, 22, 25 control the respective electrical consumer 3, 4, 5. The data processing units 20, 23, 26 can be adapted to decode commands received via the respective data connection 6, 7, 8. For example, if the electrical consumer is a lamp, the data processing unit can decode a received command, wherein the decoded command may be a control command for controlling the respective power supply or another element of the respective electrical consumer which is not shown in FIG. 1. In an embodiment, one or several of the electrical consumers are sensors like presence sensors which are adapted to detect, for example, optically or acoustically, the presence of a person. These sensors preferentially comprise a separate power supply, in order to allow to sense, for example, the presence of a person, even if the port to the sensor is switched off, i.e. even if the apparatus 1 does not supply power to the sensor. If the sensor has detected the presence of a person, the sensor can send an activate request to the apparatus 1, in order to activate the port to the sensor for supplying the sensor with power of the apparatus via the respective data connection. The received power can then be used to allow the sensor to generate control signals by the data processing unit of the sensor. The control signals can be sent to other electrical consumers being, for example, lamps via the apparatus 1, wherein these lamps can then be controlled depending on the control signals generated by the sensor. The lamps itself can also comprise an own power supply, in order to provide, for example, a low intensity emergency light, if the port to the respective lamp is switched off such the power is not supplied to the respective lamp. If the apparatus 1 receives data for the lamp, for example, a control signal generated by a presence sensor, the controller 10 can activate the port to the respective lamp such that power is supplied to the respective lamp and the lamp can be activated, for example, can provide light having a larger intensity than the low intensity emergency light, in particular, depending on a control signal generated by a presence sensor.

Figure 2:
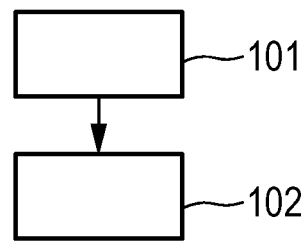
FIG. 2 shows exemplarily a flowchart illustrating an embodiment of a method for powering an electrical consumer via a data connection.

In the following an embodiment of a method for powering an electrical consumer via a data connection will be described with reference to a flowchart shown in FIG. 2.

In step 101, data to be sent to the respective electrical consumer 3, 4, 5 are received by the data receiving unit 9. In step 102, the supply of power to the respective electrical consumer 3, 4, 5, to which the received data should be sent, is activated via the respective data connection 6, 7, 8 by the controller 10, if the supply of power to the respective electrical consumer 3, 4, 5 is deactivated, wherein power is supplied to the respective electrical consumer 3, 4, 5 via the respective data connection 6, 7, 8 by the power supply unit 2. In particular, for activating the supply of power to the respective electrical consumer 3, 4, 5, the above mentioned PoE standard is preferentially used by the controller 10.

The apparatus and method for powering an electrical consumer via a data connection can be used for powering all kinds of low power consumers like lighting equipment, for example, sensors, switches, light sources, et cetera, or entertainment appliances like active speakers, internet radios, DVD players, set-top boxes and even TV sets.

The apparatus can be adapted to supply power levels above 50 W via a data connection being a Cat5 connection.

In known PoE systems the PSE is required to cut the power device, i.e. the electrical consumer, off, if the power device fails to consume enough current, for example, 10 mA, over a certain time, for example, if the power device fails to consume 10 mA over 75 ms every 325 ms. Thus, whenever a power device happens to draw less than 10 mA, there could be a problem. This is especially important, if a power device has a power on/off function. When the power is turned off, it still needs to draw the minimum current of, for example, 10 mA or the PSE will switch off the power of the power device. In contrast, the apparatus for powering an electrical consumer via a data connection, which has been described above with reference to FIG. 1, allows the powered device to be switched off, i.e. the powered device can be completely deactivated, without needing to draw, for example, 10 mA, and, if the power device has to be activated again, for example, because a command has to be sent to the powered device via the data connection, the controller of the apparatus activates the supply of power to the device again. Thus, according to the above described embodiment, the supply of power to the device can be switched off and, if the device is needed again, the supply of power to the device will be activated. This reduces the power consumption of the powered device.

The apparatus for powering an electrical consumer via a data connection provides a low power strategy that allows for radical reduction of standby losses. This may reduce energy consumption in inactive PoE systems not only for distributed electronic data processing equipment, but also for PoE lighting systems substantially. The apparatus preferentially makes use of switchable PoE outlets that are specified as a requirement in the PoE standard to only switch power on when a PoE powered device, i.e. an electrical consumer, is being detected. The power of the outlets, i.e., for example, of the ports 13, 14, 15 described above with reference to FIG. 1, can be switched off under standby condition and can be re-activated whenever the respective electrical consumer sitting on the respective outlet is addressed. The apparatus can rely on user configuration or can be made adaptive, in order to automatically learn about the configuration and the power-down behavior.

For example, the apparatus can be adapted to allow a user to configure whether, if a port is deactivated, only the power supply is deactivated or also the ability to receive data from and send data to the electrical consumer connected to the respective port. Moreover, the apparatus is preferentially adapted to switch at least the power of a port off, if the apparatus detects that the electrical consumer connected to the respective port consumes power below a threshold being indicative of a standby mode of the electrical consumer. The apparatus can be adapted to determine the threshold for the respective electrical consumer in a configuration mode, wherein the power consumption is determined by the apparatus, while the electrical consumer is known to be in the standby mode, and wherein the power consumption is determined, while the electrical consumer is known to be in an active mode. The threshold is preferentially determined as a power consumption value being between power consumption values determined for the standby mode, which may also be regarded as an inactive state of the electrical consumer, and determined for the active mode. The apparatus can comprise an input unit like a key for allowing a user to enter into the apparatus that the apparatus should configure itself, for example, determine the above mentioned thresholds for the electrical consumers connected to the apparatus, in a configuration mode. The apparatus can also receive a configuration command from an external controller, in particular, from an electrical consumer connected to the apparatus.

In the following a further embodiment of a method for powering an electrical consumer via a data connection will exemplarily described with reference to a flowchart shown in FIG. 3.

Figure 3:
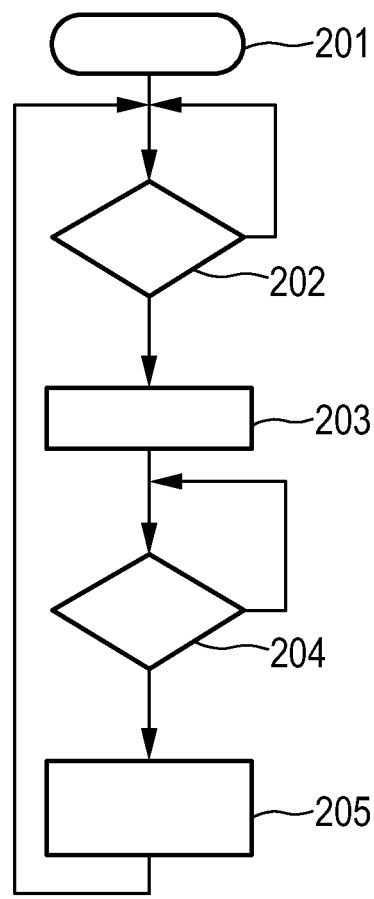
FIG. 3 shows exemplarily a flowchart illustrating a further embodiment of a method for powering an electrical consumer via a data connection.

The control flow shown in FIG. 3 describes a standby power management. In step 201, one or several electrical consumers 3, 4, 5 are supplied with power by the apparatus 1 via the respective data connection 5, 6, 7. For establishing the power supply to the one or several electrical consumers 3, 4, 5, a procedure is preferentially followed, which is described in the above mentioned PoE standard.

In step 202, for each port 13, 14, 15 where the standard procedure of PoE as described in the above mentioned part of the IEEE standard has led to power supplied on the port the power consumption of the respective electrical consumer 3, 4, 5 gets monitored. This is already a pre-requisite to fulfill the PoE standard. If the electrical consumer 3, 4, 5 releases consumption below a threshold that may be the same as the lowest consumption as specified in the above mentioned part of the IEEE standard, the respective port 13, 14, 15 gets deactivated by the controller 10. Also this preferentially follows the PoE standard.

In extension to the standard however, the apparatus 1 has preferentially a memory for the IP address associated to the respective port 13, 14, 15, i.e. the apparatus 1 comprises the state storage unit 11. This memory or state storage unit can be regarded as being a part of a data processing circuitry of the apparatus 1. If a message for that IP address is detected, the PSE management, i.e. the controller 10, gets a request to power up the respective port 13, 14, 15 again. The rules for testing the connected electrical consumer still apply. These ask from the PSE, i.e. the apparatus 1, to ensure that it does not apply 48 V to a non PoE enabled device. For this the PSE will, as already mentioned above, initially apply a low voltage, i.e., for example 2.7 V to 10.1 V, and look for a signature resistance of 25 kΩ. The PSE will expect that the signature resistance will be after some form of auto-polarity circuit and will compensate for the DC offset in the signature. The maximum input capacitance of the respective electrical consumer 3, 4, 5 must be smaller than 150 nF. But, now the respective electrical consumer 3, 4, 5 is getting again activated, like it were plugged-in, anew, and, for example, after a waiting time the message to the related IP address gets sent to the respective electrical consumer 3, 4, 5. Thus, if in step 202 it is monitored that the power consumption of a respective port 13, 14, 15 is below a threshold, the power supply for the respective port 13, 14, 15 is switched off in step 203. In step 204, it is monitored, whether a message for the respective deactivated port 13, 14, 15 has been received. If a message for the IP address of the respective port 13, 14, 15 has been received, in step 205 the power for the respective port 13, 14, 15 is switched on and, for example, after a waiting time the message for the related IP address is sent again to the respective electrical consumer 3, 4, 5. In this way the power consumption of an electrical consumer can get down to zero, because the electrical consumer does not get any feeding during inactive times. The described mechanism supports every slave device that needs to be waked-up only through network traffic.

The message to be sent to the respective electrical consumer 3, 4, 5 is buffered and the buffered message may be sent to the reactivated device repeatedly multiple times to accommodate different start-up delays of different types of electrical consumers. The apparatus can also be adapted to monitor the power consumption to detect the end of the start-up procedure. For example, the power consumption of lamp devices can be detected and power can be supplied to different lamp types, without taking the longest start-up time as waiting time for all appliances. In a particular, in lighting over PoE applications this mechanism may lead to enormous reduction of power consumption in the inactive state.

Figure 4:
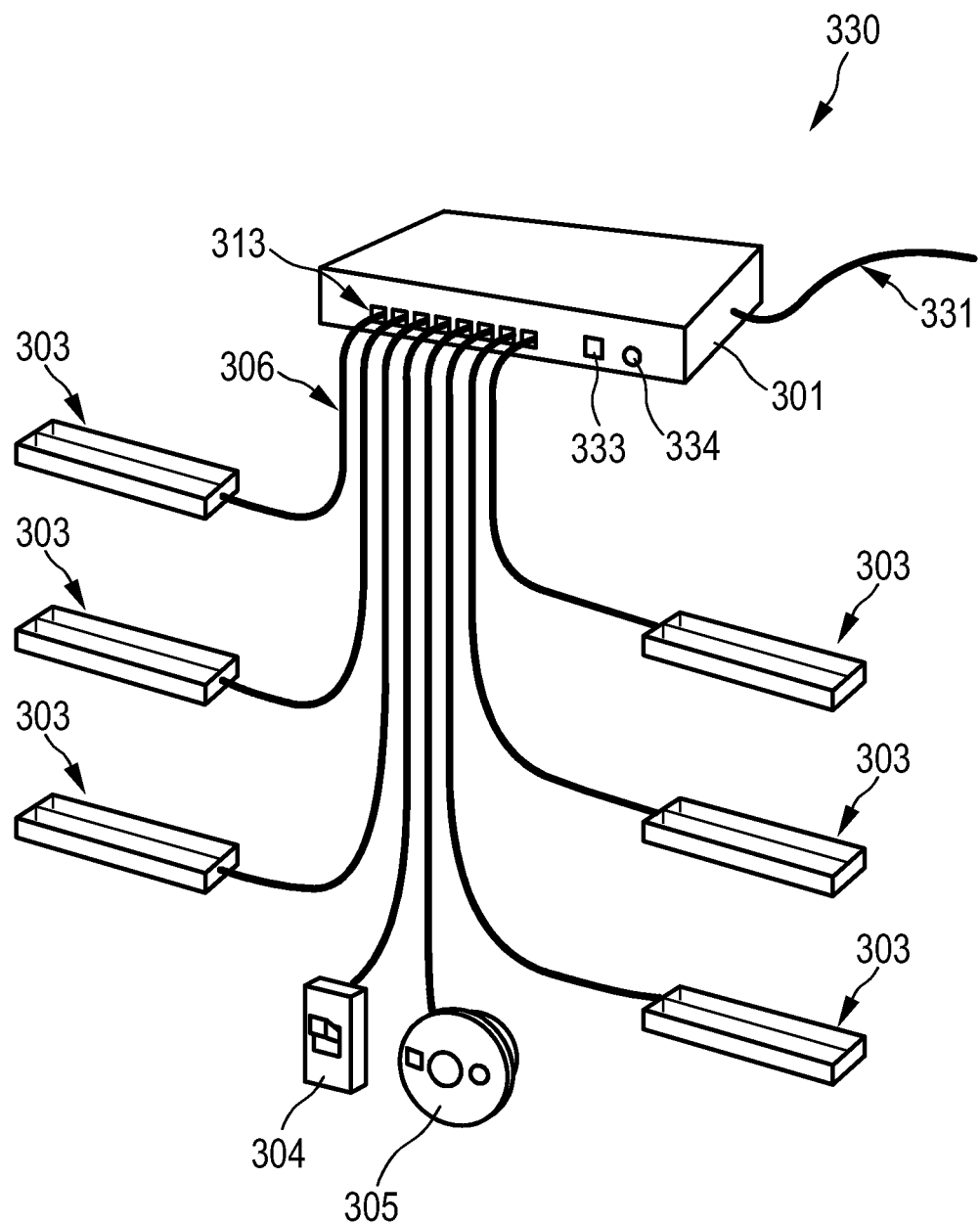
FIG. 4 shows schematically and exemplarily an embodiment of a system comprising the apparatus, the electrical consumer and the data connection.

FIG. 4 shows schematically and exemplarily an embodiment of a lighting system 330 comprising an apparatus 301 for powering an electrical consumer via a data connection. The apparatus 301 for powering an electrical consumer via a data connection can be similar to the apparatus described above with reference to FIG. 1. The apparatus 301 comprises several ports 313 to which several electrical consumers 303, 304, 305 are connected via data connections 306. In this embodiment, the data connections 306 are Ethernet cables.

The electrical consumers are PoE light sources 303, PoE switches 304 and PoE sensors 305 with zero-power standby. Data can be received by the apparatus 1 via a data connection 331 which is also preferentially an Ethernet cable.

The sensor 305 is, for example, a light sensor or an acoustical sensor or an infrared sensor for detecting the presence of persons. This allows controlling the light sources 303 depending on the present light intensity and/or depending on the presence of a person. The PoE light sources 301 can comprise an energy saving lamp, a fluorescent lamp, a light emitting diode, in particular, an organic light emitting diode, a halogen lamp, et cetera. The apparatus 301 can further comprise a small lamp 333 for indicating a certain mode of the apparatus, for example, for indicating whether the apparatus is in a configuration mode or not. Moreover, the apparatus 301 can comprise a key 334 for allowing a user to set the apparatus in a configuration mode.

The apparatus for powering an electrical consumer via a data connection can be adapted to introduce an addition to the protocol defined in the above mentioned PoE standard, wherein the addition allows PoE equipment, i.e. the above mentioned electrical consumers, to request standby condition from the apparatus 1, which may be regarded as being or comprising a switch, and eventually request power-up in addition. This is particularly possible for electrical consumers with limited local energy supply or energy storage, where a user input at the respective electrical consumer leads to a power-up request. This allows, for example, the above mentioned PoE switch 304 and the PoE sensor 305 to be deactivated to a zero-power-standby state, i.e. to a state in which the PoE switch and/or the PoE sensor do not receive power from the apparatus 1.

The apparatus for powering an electrical consumer via a data connection can also be adapted to support recharge cycles for devices, i.e. electrical consumers, with limited energy storage or non-constant energy harvesting. These devices, for example, the sensor 305, can be adapted to request reactivation of the Ethernet power, whenever the energy in the storage device gets near to exhausted or the harvesting, for example, by a photovoltaic cell, does not give sufficient power.

The apparatus for powering an electrical consumer via a data connection can be used in systems, which are based on PoE power distribution, extending from distributed data processing systems over factory or building automation systems to lighting over Ethernet systems.

The apparatus for powering an electrical consumer via a data connection, in particular, the controller of this apparatus, which may also be regarded as a PoE management, is preferentially adapted to switch the ports, i.e. at least the power supply and optionally also the data transfer ability, to inactive PoE devices off and to reactivate these on request. The request is preferentially provided by a message sent over a data network, to which the apparatus is connected. The apparatus can be regarded as being or as comprising a PSE switch or router, which preferentially memorizes the IP addresses of devices attached to the ports of the apparatus and detects messages that are sent to devices connected to deactivated ports. The devices, i.e. the electrical consumers, can be adapted to send a message to themselves to reactivate the PoE power, i.e. the devices can send a corresponding message via the apparatus to themselves to reactivate the PoE power, if the respective port has deactivated the power supply but not the data transfer ability. This reactivation can be performed such that devices with limited power supply reactivate PoE whenever a local power supply of the respective device runs low, i.e., for example, is below a predefined threshold. The message sent to the apparatus is preferentially stored and can be re-sent after a waiting time to support start-up timing of the power devices. Special messages of the powered devices can be used to set power-down timing and/or PoE supply or detection levels, for example, the special messages can contain information defining a power consumption threshold of a powered device, i.e. of an electrical consumer, which can be used for distinguishing between a standby state of the powered device, which can be regarded as an inactive or deactivated state of the powered device, and an active state.

PoE is a standard to supply detached data equipment and peripherals through the same wire that is already used to connect these to the Ethernet. The apparatus for powering an electrical consumer via a data connection can be adapted to supply power over the Ethernet and can provide low power strategies for radical reduction of standby losses of distributed electronic data processing equipment or other devices. This can reduce energy consumption in inactive PoE devices substantially. It can seamlessly extend the PoE standard IEEE 802.3.af to reduce power consumption in periods of reduced activity. In particular, the activation of a port, i.e. the activation of the supply of power to an electrical consumer, is preferentially performed in accordance with the PoE standard IEEE802.3af. But, in addition to this PoE standard, the apparatus, i.e. the PSE, can deactivate the port, in particular, switch the port completely off, to which a PoE enabled electrical consumer is connected. Moreover, in addition to the PoE standard it can check whether received data are addressed to an electrical consumer connected to a deactivated port, wherein, if this is the case, the respective port is activated.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

For example, functions like receiving data, activating a supply to an electrical consumer, storing received data, sending data to an electrical consumer, et cetera, performed by one or several units or devices can be performed by any other number of units or devices. The control of the apparatus for powering an electrical consumer via a data connection in accordance with the method for powering an electrical consumer via a data connection can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an apparatus for powering an electrical consumer via a data connection. The apparatus comprises a power supply for supplying power to the electrical consumer via the data connection, a data receiving unit for receiving data to be sent to the electrical consumer, and a controller for activating the supply of power to the electrical consumer via the data connection, if data to be sent to the electrical consumer have been received and the supply of power to the electrical consumer is deactivated. The electrical consumer itself does therefore not need to receive power from the apparatus, in order to stay alert to be able to react on data connection activity, thereby reducing the power consumption.

The invention claimed is:

1. An apparatus for powering an electrical consumer via a data connection, the apparatus comprising:
   a power supply for supplying power to the electrical consumer via the data connection;
   a data receiving unit for receiving data to be sent to the electrical consumer; and
   a controller configured to activate the supply of power to the electrical consumer on condition that data addressed to and to be sent to the electrical consumer have been received and that the supply of power to the electrical consumer is deactivated.

2. The apparatus as defined in claim 1, wherein the apparatus comprises a data storage unit for storing the received data, wherein the controller is adapted to send the stored received data to the electrical consumer via the data connection, after the supply of power to the electrical consumer has been activated.

3. The apparatus as defined in claim 2, wherein the controller is adapted to send the stored received data to the electrical consumer via the data connection, after a predetermined time after the controller has started to activate the supply of power to the electrical consumer.

4. The apparatus as defined in claim 2, wherein the controller is adapted to repeatedly send the stored received data to the electrical consumer.

5. The apparatus as defined in claim 1, wherein the apparatus comprises a state storage unit for storing data indicating whether the supply of power to the electrical consumer is activated or deactivated, wherein the controller is adapted to activate the supply of power to the electrical consumer via the data connection, if the data to be sent to the electrical consumer have been received and the data stored in the state storage unit indicates that the supply of power to the electrical consumer is deactivated.

6. The apparatus as defined in claim 1, wherein the controller is adapted to determine whether the received data comprise a deactivate command indicating that the electrical consumer is to be deactivated.

7. The apparatus as defined in claim 6, wherein the controller is adapted to deactivate the supply of power to the electrical consumer if the controller has determined that the received data comprise a deactivate command.

8. The apparatus as defined in claim 6, wherein the apparatus comprises a state storage unit, wherein the state storage unit is adapted to store data indicating that the supply of power to the electrical consumer is deactivated if the controller has determined that the received data comprise a deactivate command.

9. The apparatus as defined in claim 1, wherein the controller is adapted to determine whether the electrical consumer is activated or deactivated.

10. The apparatus as defined in claim 9, wherein the controller is adapted to determine a power consumption of the electrical consumer and to determine whether the electrical consumer is activated or deactivated depending on the determined power consumption.

11. The apparatus as defined in claim 1, wherein the controller is adapted to receive from the electrical consumer a deactivate request indicating that the electrical consumer should be deactivated, wherein the controller is adapted to control the power supply such that the supply of power to the electrical consumer is deactivated, if the deactivate request has been received.

12. The apparatus as defined in claim 1, wherein the controller is adapted to receive from the electrical consumer an activate request indicating that the electrical consumer should be activated, wherein the controller is adapted to control the power supply such that the supply of power to the electrical consumer is activated, if the activate request has been received.

13. A system comprising:
   at least one electrical consumer;
   the apparatus for powering an electrical consumer via a data connection as defined in claim 1; and
   at least one data connection for transmitting data between the apparatus and the at least one electrical consumer and for powering the at least one electrical consumer via the at least one data connection by the apparatus.

\* \* \* \* \*